US007082012B2

(12) United States Patent
Macpherson et al.

(10) Patent No.: US 7,082,012 B2
(45) Date of Patent: Jul. 25, 2006

(54) DISC DRIVE BREATHER FILTER MOUNTED TO A FLEX CIRCUIT BRACKET

(75) Inventors: Aaron Macpherson, Fort Collins, CO (US); Terence H. West, Longmont, CO (US); Daniel S. Thompson, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 130 days.

(21) Appl. No.: 10/638,517

(22) Filed: Aug. 11, 2003

(65) Prior Publication Data

US 2005/0036232 A1    Feb. 17, 2005

(51) Int. Cl.
G11B 33/14    (2006.01)
G11B 25/04    (2006.01)

(52) U.S. Cl. ................... 360/97.02; 360/264.2
(58) Field of Classification Search ............. 360/97.02, 360/264.2, 266.3
See application file for complete search history.

(56) References Cited

U.S. PATENT DOCUMENTS

| 5,307,222 | A | 4/1994 | Dion |
| 5,392,177 | A | 2/1995 | Chainer et al. |
| 5,764,435 | A | 6/1998 | Sugimoto et al. |
| 6,208,484 | B1 | 3/2001 | Voights |
| 6,266,208 | B1 | 7/2001 | Voights |
| 6,285,524 | B1 | 9/2001 | Boigenzahn et al. |
| 6,822,824 | B1 * | 11/2004 | Macpherson ............ 360/97.01 |
| 2002/0089781 | A1 | 7/2002 | Tuma |

FOREIGN PATENT DOCUMENTS

| JP | 2003100070 A | * | 4/2003 |
| JP | 2003151258 A | * | 5/2003 |

* cited by examiner

*Primary Examiner*—Craig A. Renner
(74) *Attorney, Agent, or Firm*—Leanne R. Taveggia; Westman, Champlin & Kelly, P.A.

(57) ABSTRACT

A breather filter is assembled within a disc drive by positioning the filter atop a flex circuit bracket on a base plate of the drive. A breather port is formed through a top cover of the disc drive, and an inlet of the breather filter is sealed against the top cover of the drive. Compressing the top cover against the top of the breather filter helps to retain the filter in position between the flex circuit bracket and the top cover without an adhesive connection to the top cover. The connection of the breather filter to the flex circuit bracket allows a top-down assembly of the disc drive so that an adhesive connection between the filter and the top cover of the drive is not required.

18 Claims, 7 Drawing Sheets

DISC DRIVE BREATHER FILTER MOUNTED TO A FLEX CIRCUIT BRACKET

FIELD OF THE INVENTION

This application relates generally to the field disc drive storage devices, and more particularly, to a breather filter mounted within the disc drive for filtering air passing through a breather port in the drive case.

BACKGROUND OF THE INVENTION

Disc drives are data storage devices that store digital data in magnetic form on a rotating storage medium, such as a disc. Read/write transducers or "heads" are used to transfer data between the discs and an external environment. Typically, a voice coil motor or other type of actuator is used to position the heads with respect to the disc surfaces. The actuator body pivots about a bearing assembly mounted on a base plate of the disc drive at a position closely adjacent to the outer extreme of the discs. The heads read data and transfer it along an actuator arm to a preamplifier which amplifies the signals coming from the heads.

A flex circuit provides an electrical pathway between the preamplifier of the actuator arm and a disc drive circuit board mounted on an exterior side of the base plate opposite the actuator and discs. The flex circuit also sends drive signals to the voice coil motor causing the actuator arm to pivot about the bearing assembly thereby changing the position of the head relative to the disc. The flex circuit typically terminates at a pass-through connector mounted to a flex circuit bracket, where the connector extends through an opening in the base plate of the disc drive and contacts the circuit board fixed to the exterior side of the base plate. A gasket or other type of seal typically prevents air from entering the disc drive through the opening in the base plate below the flex circuit bracket.

In addition to the sealed opening below the flex circuit bracket, other openings in the disc drive base plate and top cover are typically sealed to prevent contaminants from entering the sterile disc drive environment. This is particularly important due to the fact that the read/write heads actually "fly" a very small distance above the spinning discs. Thus, even a microscopically small particle on the surface of the disc could cause a head "crash." Recirculation filters are typically placed within the disc drive interior to help eliminate any particles that might be sealed within the drive during the manufacturing process. These recirculation filters take advantage of the air currents generated within the drive interior to capture rogue particles.

In addition to the threat of dust or other particulates, a further cause of "head crashes" within a disc drive relates to changes in temperature and pressure within the drive during operation of the drive. The interior temperature of a disc drive can vary greatly due to the operation of the different motors within the drive and the rapidly spinning discs, as well as the fact that the disc drive is typically contained within a closed computer case that also experiences a rise in temperature during operation of the computer. To prevent changing temperatures from altering the air pressure (and thus the fly height of the heads) within the disc drive, a small breather port is typically formed in the disc drive case to equalize the air pressure in the drive with the ambient pressure outside of the drive. To prevent particulates and caustic chemicals contained in the ambient air from contaminating the interior of the drive, a breather filter is typically attached to the breather port within the drive. The breather filter can also include a desiccant or other material to absorb water vapor.

Prior art breather filters have suffered from a number of drawbacks relating mainly to longevity and ease of installation. With regard to longevity, the cramped conditions within present disc drive cases necessitate a small filter size that typically cannot hold a sufficient amount of chemical adsorbent (such as activated charcoal) to last over the rated lifetime of the drive. With regard to installation, breather ports are typically formed in the top cover of a disc drive while the breather filters are adhered to an inner surface of the top cover by a double-sided tape or a pressure sensitive adhesive. However, the use of such adhesives may cause undesirable outgassing within the interior of the drive, while simultaneously creating problems on the assembly line should it be necessary to remove the filter from the cover during a rework of the drive. Furthermore, current manufacturing trends favor a "top-down" assembly system where it is desirable to attach as many components as possible to the base plate of the drive while avoiding adhering components to the inner surface of the top cover.

It is thus desirable to provide a breather filter for a disc drive that maximizes the life expectancy of the filter material while avoiding the installation problems commonly found with prior art breather filters.

SUMMARY OF THE INVENTION

Against this backdrop the present invention has been developed. In accordance with a preferred embodiment of the present invention, a disc drive includes a base plate and a top cover defining an interior volume that encompasses a flex circuit having a pass-through electrical connector extending through an opening formed in the base plate. A breather filter is attached to a top surface of a flex circuit bracket which in turn is secured to the base plate of the disc drive over top of the opening in the base plate. The breather filter includes an inlet in fluid communication with ambient air outside of the disc drive and an outlet in fluid communication with the interior volume of the disc drive, and the breather filter provides chemical and particulate filtering of the ambient air. The breather filter is supported atop the flex circuit bracket without the use of adhesives.

In one embodiment, the filter inlet communicates with a breather port formed in the top cover of the disc drive. A seal is preferably compressed about the filter inlet and the corresponding breather port to prevent leakage of the ambient air within the interior environment of the disc drive. The compression of the seal against the top of the breather filter helps to retain the filter between the flex circuit bracket and the top cover without an adhesive connection to the top cover. In a second embodiment, the filter inlet communicates with a breather port formed in the flex circuit bracket, and the filter is securely attached to the flex circuit bracket so that no connection is required between the filter and the top cover. Indeed, the filter outlet is positioned a predetermined distance below the top cover of the disc drive to allow unimpaired fluid communication between the filter and the interior volume of the disc drive. In the first embodiment a diffusion tube may be integrated with the filter body, while in the second embodiment a diffusion tube may be formed integrally with the flex circuit bracket.

A further embodiment of the present invention is a disc drive comprising a base plate, a top cover attached to the base plate to define an interior volume of the disc drive, a flex circuit for transferring data from a data disc within the disc drive to external circuitry, and a breather filter supported atop a flex circuit bracket. The breather filter includes a filter inlet and alignment means for aligning the filter inlet with a breather port formed in the disc drive. In one embodiment, the breather port is formed in the top cover of the disc drive so that the filter inlet is sealed against the top cover of the disc drive, whereby the compression between the top cover and the breather filter helps to retain the breather filter in position atop the flex circuit bracket without the use of adhesives. In a second embodiment, the breather port is formed in the flex circuit bracket itself and the filter inlet is securely fastened to the flex circuit bracket so that the filter outlet can be positioned a predetermined distance below the top cover of the disc drive without engaging the top cover.

Another embodiment of the present invention is a top-down method of assembling a disc drive containing a breather filter. The method includes installing a flex circuit bracket onto a base plate of the disc drive and then attaching a breather filter to a top surface of the flex circuit bracket. The breather filter includes an inlet adapted to engage a breather port formed in the disc drive and an outlet adapted to expel filtered air into an interior volume of the disc drive. The method further includes attaching a top cover to the base plate following installation of the breather filter without adhering the breather filter to an inside surface of the top cover. In one embodiment, where the breather port is formed in the top cover of the disc drive, the method includes placing a seal atop the breather filter so that the top cover compresses the seal and creates a hermetic seal around the filter inlet while simultaneously retaining the breather filter in place atop the flex circuit bracket. In a second embodiment, where the breather port is formed in the flex circuit bracket, the method includes fastening the filter body to the flex circuit bracket so that the filter inlet is aligned with the breather port in the flex circuit bracket and so that the filter outlet is positioned a predetermined distance below the top cover of the disc drive to provide uninhibited airflow though the breather filter.

These and various other features as well as advantages which characterize the present invention will be apparent from a reading of the following detailed description and a review of the associated drawings.

DETAILED DESCRIPTION

Figure 1:
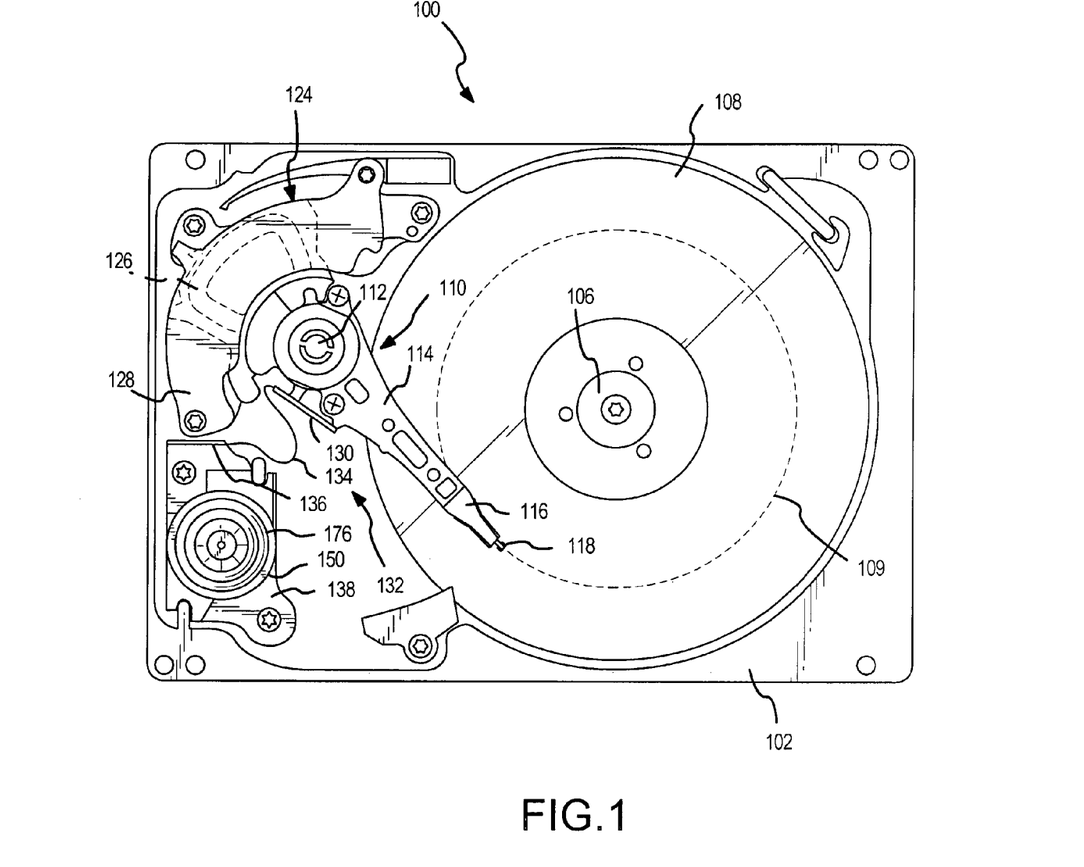
FIG. 1 is a plan view of a disc drive according to a preferred embodiment of the present invention, where a top cover has been removed to illustrate the primary internal components of the disc drive, including a breather filter mounted atop a flex circuit bracket in accordance with a first preferred embodiment of the present invention.

A disc drive 100 constructed in accordance with a preferred embodiment of the present invention is shown in FIG. 1. The disc drive 100 includes a base plate 102 to which various components of the disc drive 100 are mounted. A top cover 104 (FIG. 2) cooperates with the base plate 102 to form an internal, sealed environment for the disc drive in a conventional manner. The components include a drive motor 106 which rotates one or more discs 108 at a constant high speed. Information is written to and read from tracks 109 on the discs 108 through the use of an actuator assembly 110, which rotates about a bearing shaft assembly 112 positioned adjacent the discs 108. The actuator assembly 110 further includes an actuator arm 114, or E-block, which extend towards the discs 108, with one or more flexures 116 extending from the actuator arm 114. Mounted at the distal end of each of the flexures 116 is a read/write head 118 which includes an air bearing slider enabling the head 118 to fly in close proximity above the corresponding surface of the associated disc 108.

The radial position of the heads 118 is controlled through the use of a voice coil motor (VCM) 124, which typically includes a coil 126 attached to the actuator assembly 110, as well as one or more permanent magnets 128 that establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112 and the heads 118 are caused to move across the surfaces of the discs 108.

A flex circuit 132 provides the requisite electrical connection paths for the actuator assembly 110 while allowing pivotal movement of the actuator assembly 110 during operation. The flex circuit includes a preamplifier 130, a flexible ribbon portion 134, and a fixed ribbon portion 136. Head wires or electrical traces (not shown) are connected from the heads 118 along the flexures 116 and routed along the actuator arm 114 to the preamplifier 130. The preamplifier 130 typically includes circuitry for controlling the write currents applied to the heads 118 during a write operation and for amplifying read signals generated by the heads 118 during a read operation. The flexible portion 134 of the flex circuit 132 connects the preamplifier 130 to the fixed portion 136 of the flex circuit 132. The fixed portion 136 of the flex circuit 132 is mounted to a flex circuit bracket 138 which, in turn, is mounted to the base plate 102, as best shown in FIG. 2.

Both the flexible and fixed portions 134 and 136, respectively, of the flex circuit 132 are formed from a polyimide film such as that sold by DuPont under the trade name Kapton®, although other available flexible films may be used. The flex circuit material preferably wraps around the flex circuit bracket 138 so that electrical traces carried by the material connect to a pass-through electrical connector (see FIG. 5) attached to the bottom surface of the flex circuit bracket 138. The flex circuit bracket 138 is preferably screwed or otherwise fixed to the base plate 102 so that the pass-through connector (see FIG. 5) extends through an opening 140 formed in the base plate 102. In this manner, spring-biased leads on the connector may engage electrical pads on a printed circuit board (not shown) that is connected to a bottom side of the base plate. Alternatively, the connector may contain pads that contact spring-biased leads found on the printed circuit board. The details of the connection of the pass-through connector to the circuit board are well known to those skilled in the art, although for the purposes of the present invention it is important to note that the opening 140 in the base plate 102 allows signals to pass between the flex circuit 132 and an external circuit board (not shown).

Because the flex circuit bracket 138 sits flat atop the base plate 102 as shown in FIG. 1, there is sufficient space between the flex circuit bracket 138 and the top cover 104 to house a relatively large breather filter 150. Specifically, the breather filter 150 shown in FIGS. 1–3 preferably comprises a canister filter having a cylindrical body 152 and a closed first end 154 (FIG. 2) defining a filter inlet 156 (although filters of different shapes may be employed). An open second end 158 (FIG. 3) of the body 152 preferably mates with a circular filter screen 160 to define an enclosed interior volume of the breather filter 150. A disc 162 of activated charcoal or a similar chemical adsorbent material is preferably inserted within the interior of the breather filter 150 to remove potentially caustic chemicals as described in greater detail below. The filter screen 160 thus provides a filter outlet at the second end 158 of the filter 150 while simultaneously preventing any of the charcoal material from contaminating the interior of the drive 100 (the screen 160 also acts as a filter to any other airborne particulates that might enter the filter 150). The breather filter 150 further includes two alignment arms 164 extending outwardly from the cylindrical body 152, as described in greater detail below.

Figure 2:
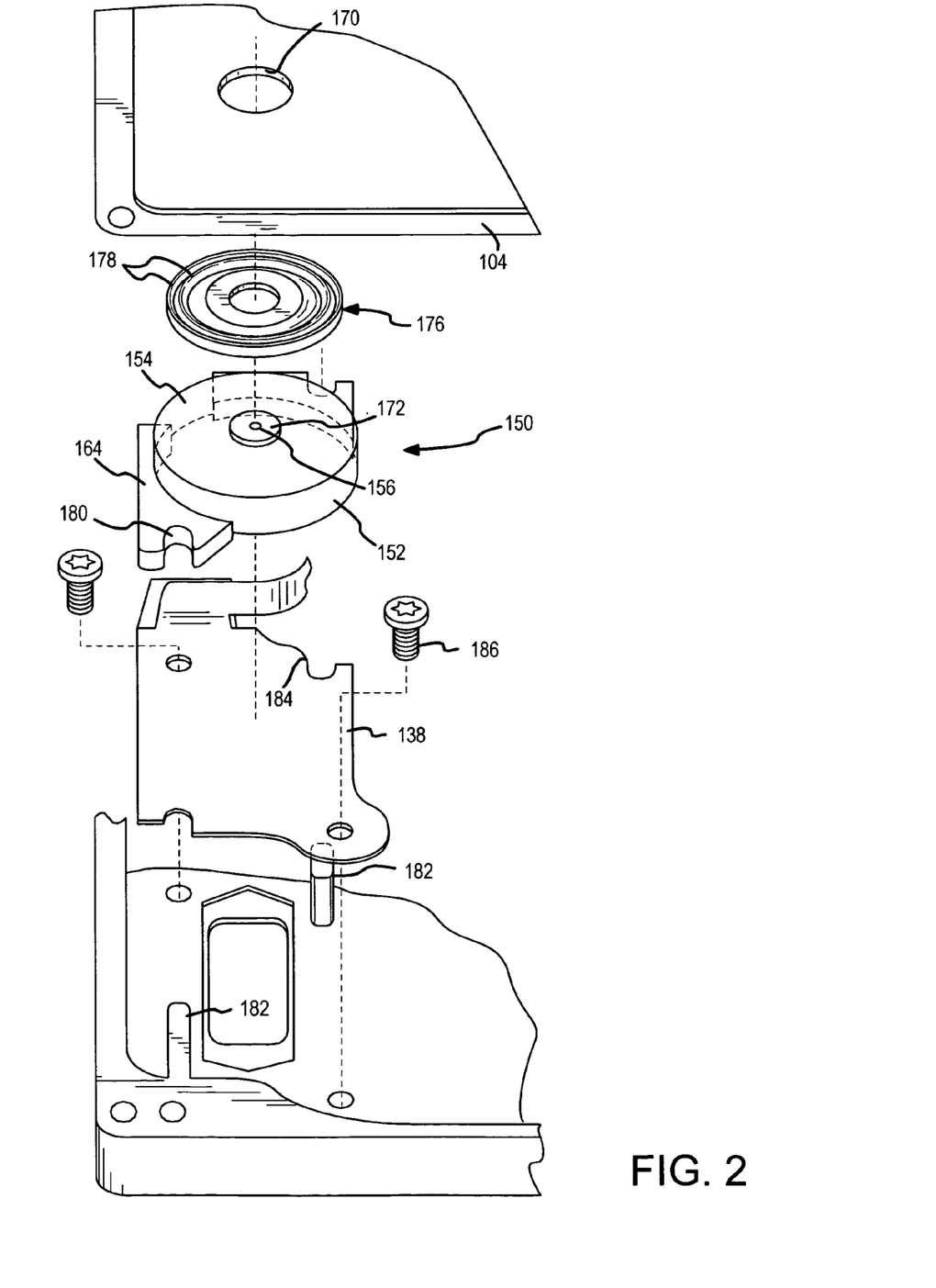
FIG. 2 is an enlarged, exploded view of the disc drive and breather filter illustrated in FIG. 1, wherein the attachment of the breather filter between the flex circuit bracket on one side and the top cover of the disc drive on the other side is shown, and where a breather port through the top cover is depicted.

As shown in FIG. 2, the breather filter 150 is preferably situated atop the flex circuit bracket 138 so that the filter inlet 156 extends upward and aligns with a breather port 170 formed in the top cover 104 of the disc drive to provide fluid communication between the filter 150 and ambient air outside of the drive 100. In the embodiment shown in FIGS. 1–3, the filter inlet 156 is preferably centered within a cylindrical stem 172, and the entire stem 172 preferably extends upward so that a top surface of the stem 172 is centered within the breather port 170. To ensure that proper clearance will be available for the filter inlet 156 when the disc drive 100 is installed within a computer, the top surface of the stem 172 does not extend upward through the breather port 170 but rather remains slightly recessed below the top surface of the top cover 104.

An annular seal 176 preferably sits atop the first end 154 of the cylindrical body 152 and surrounds the stem 172 so that the seal 176 is compressed between the breather filter 150 and the inner surface of the top cover 104 when the disc drive 100 is assembled. In one preferred embodiment, the seal 176 includes two concentric annular rings 178 to provide a redundant airtight seal surrounding the breather port 170 and the stem 172 containing the filter inlet 156. Thus, as best shown in FIG. 2, the seal 176 allows ambient air outside of the disc drive 100 to communicate with the filter inlet 156 but prevents such ambient air from directly entering the internal environment of the drive 100 by leaking past the annular rings 178 of the seal 176.

Each arm 164 extending from the cylindrical body 152 of the filter 150 includes a slot 180 for receiving one of two alignment pins 182 formed on the base plate 102. The flex circuit bracket 138 includes similar slots 184 for receiving the alignment pins 182. However, while the flex circuit bracket 138 is fastened to the base plate 102 with screws 186, the breather filter 150 is preferably not fastened to the base plate 102 but rather is permitted to simply rest atop the flex circuit bracket 138 as shown in FIGS. 1 and 2. Once the top cover 104 of the disc drive 100 is secured to the base plate 102 with fasteners (not shown), the top cover 104 compresses the seal 176 so that the breather filter 150 is preferably held in place between the top cover 104 and the flex circuit bracket 138 without the need of any fasteners. This construction simplifies the assembly of the disc drive 100 and eliminates any concerns regarding the use of adhesives (e.g., outgassing and removal of the seal during a rework of the drive) to fix the filter 150 or the seal 176 to the top cover 104 of the drive 100.

Figure 3:
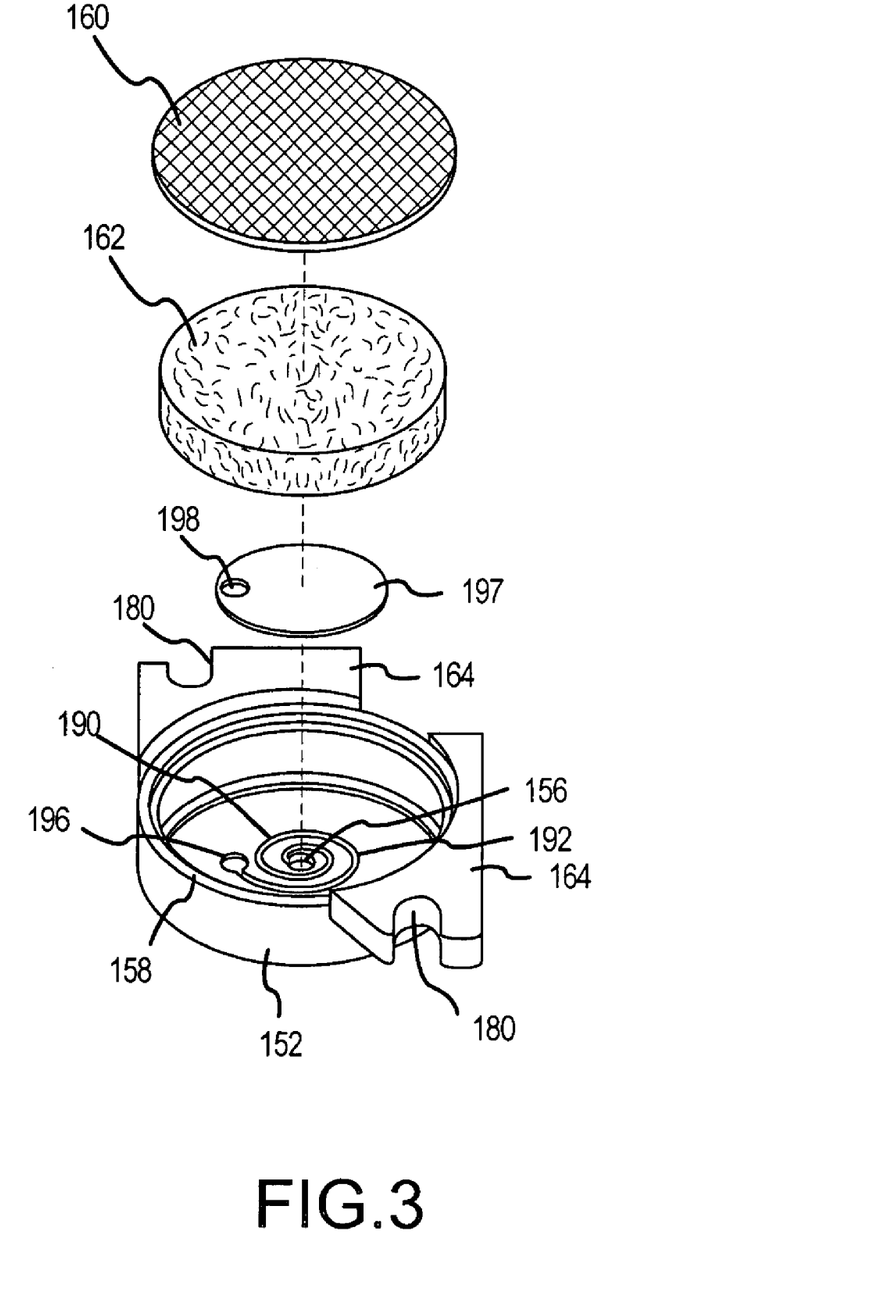
FIG. 3 is an enlarged, exploded view of the breather filter depicting the details of the filter construction.

Because air exits the filter 150 at the filter outlet or second end 158 of the filter through the screen 160, it is necessary for the second end 158 to remain elevated a predetermined distance above the top surface of the flex circuit bracket 138 to allow unimpeded fluid communication through the filter 150 and into the interior environment of the drive 100. In the preferred embodiment shown in FIGS. 1–3, the alignment arms 164 are preferably sized so that they extend below the level of the second end 158 of the filter 150, as best shown in FIG. 3. In this manner, the arms 164 rest on the top surface of the flex circuit bracket 138 and ensure that the filter outlet (i.e., the second end 158 of the filter) is positioned a predetermined distance above the flex circuit bracket 138. In the preferred embodiment, the predetermined distance is on the order of 0.010 inches, although this distance could be increased or decreased as desired.

While the preferred embodiment of the filter 150 provides the above-described predetermined spacing for the filter outlet, those skilled in the art will understand that alternative constructions of the filter outlet could be provided that would still allow for air to pass through the filter 150 and into the drive interior. For example, the second end 158 of the filter 150 could rest flush against the top surface of the flex circuit bracket 138 provided that some portions of the round filter outlet would overlap the boundaries of the flex circuit bracket 138 so that air could escape the filter at these overlapping regions. Alternatively, the filter screen 160 could be slightly inset within the second end 158 of the filter and a series of notches could be formed around the circumference of the second end 158. In this manner the second end 158 could sit flush atop the flex circuit bracket 138 while still providing fluid communication with the interior of the drive 100 through the openings between the notches.

In addition to the inclusion of a charcoal disc 162 and a filter screen 160, FIG. 3 illustrates that the breather filter 150 preferably includes a diffusion tube 190 formed integrally with the closed first end 154 of the filter 150. Diffusion tubes are commonly used with air filters to slow the diffusion or mass transport of air through the filter (thereby increasing the useful life of the filter material such as the charcoal disc 162). In the preferred embodiment shown in FIG. 3, the diffusion tube is formed by etching or otherwise molding a channel 192 in the inner top surface of the first end 154 of the filter body 152. The channel 192 extends from the filter inlet 156 and preferably spirals outward to a relatively large reservoir 196. The channel 192 and reservoir 196 are preferably covered by a circular disc 197 having an opening 198 positioned for alignment over the reservoir 196 as shown in FIG. 3. Once the disc 197 is secured to the inner top surface, of the filter body 152 (such as by an adhesive), the disc seals off the channel 192 to form the diffusion tube 190, while the opening 198 in the disc 197 forms a diffusion tube outlet allowing air to enter the interior of the breather filter 150 where it encounters the charcoal disc 162.

As described above, one benefit of the filter design shown in FIGS. 1–3 is that the filter 150 makes maximum use of available space above the flex circuit bracket 138 (which space was typically unutilized within the interior of the disc drive). Specifically, due to the flat nature of the flex circuit bracket 138, there exists a volume within the drive 100 between the flex circuit bracket 138 and the top cover 104 that permits a relatively large breather filter 150 containing a relatively large charcoal disc 162. Because the amount of charcoal used in the filter 150 directly corresponds to the useful life of the filter relative to its ability to adsorb potentially caustic chemicals from the ambient air, the ability to place a relatively large charcoal disc 162 within the breather filter 150 helps to extend the longevity of the filter 150. Furthermore, the location of the filter 150 atop the flex circuit bracket 138, and the use of the alignment arms 164 having slots 180 that receive the same locating pins 182 used to align the flex circuit bracket 138, simplifies the installation of the breather filter in comparison to prior art filters that required the filter to be adhesively sealed to the top cover 104 of the disc drive 100. The ability to perform a "top down" assembly of the breather filter 150 to the base plate 102, and then simply attach the top cover 104 to compress the seal 176 without requiring an adhesive connection, simplifies both the initial construction of the drive as well as any required rework of the drive since it is not necessary to break an adhesive seal to remove the filter 150 during a rework of the drive 100.

The embodiment of the breather filter 150 shown in FIGS. 1–3 utilizes a top breather port 170 formed in the top cover 104 of the disc drive. This top location of the breather port 170 is preferred so that leak testing of the disc drive 100 may be simplified. That is, in order to ensure that air does not leak into the drive interior through any potential avenue other than the breather filter 150, it is necessary to perform leak tests where the filter inlet 156 is sealed off and the interior of the drive is charged with high pressure air through a separate test port. The integrity of the disc drive's hermetic seal is thus tested by determining whether the charge air leaks from the drive 100 once the breather filter 150 is temporarily sealed off. Thus, ease of access to the filter inlet 156 during the above-described leak testing suggests the preferred location of the breather port 170 on the top cover 104. However, as described below, it is also possible to locate the breather port on the bottom of the disc drive 100 so that ambient air passes through the base plate 102 rather than the top cover 104.

Figure 4:
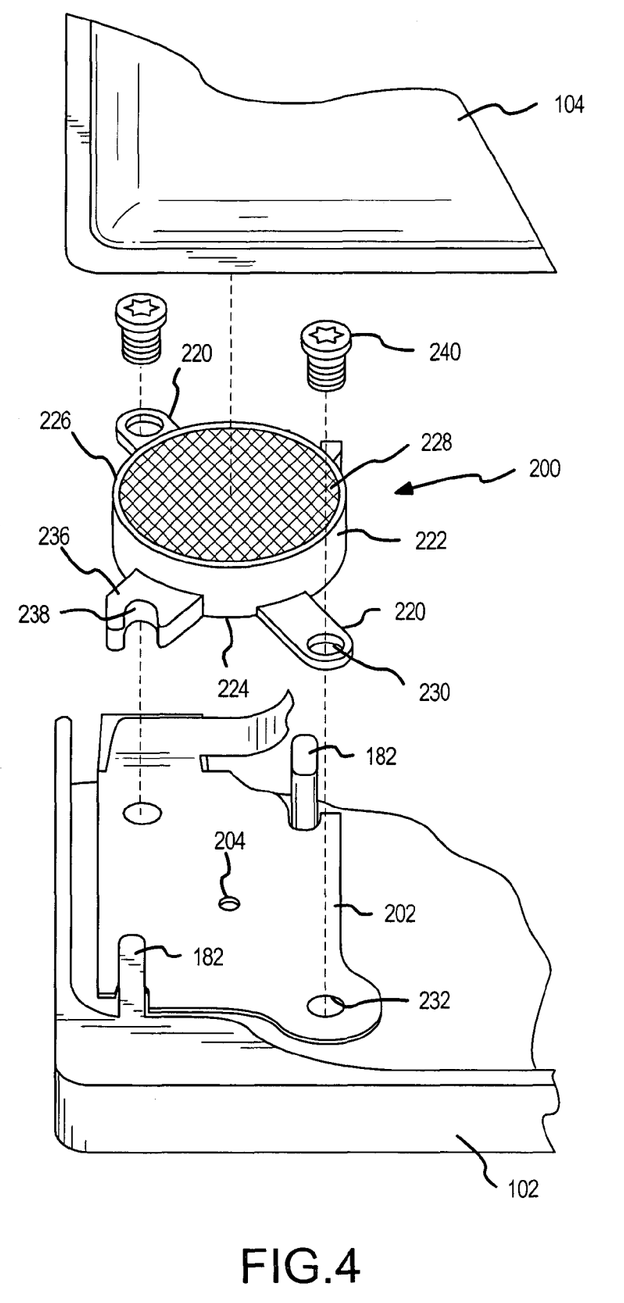
FIG. 4 is an enlarged, exploded view of a disc drive similar to FIG. 2 illustrating a second preferred embodiment of the breather filter and its attachment to the base plate of the disc drive in the case where the breather port is formed through the flex circuit bracket as opposed to the top cover of the disc drive.
Figure 5:
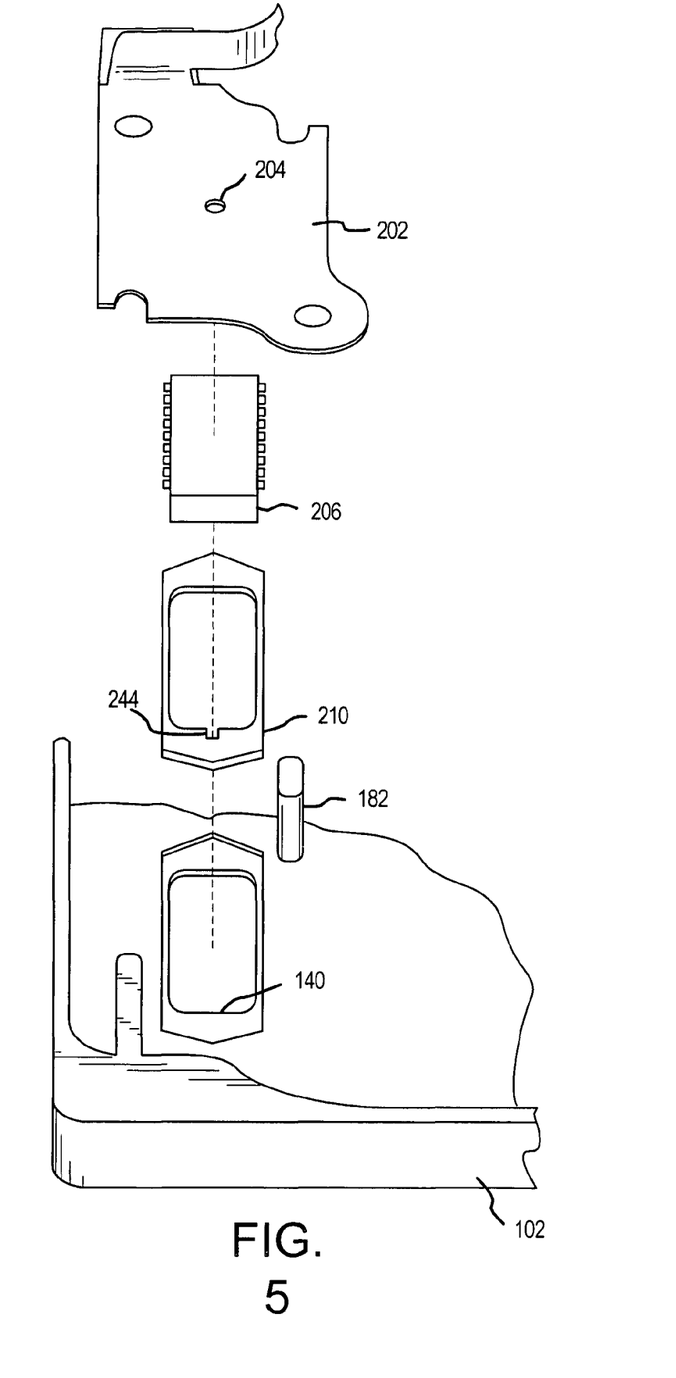
FIG. 5 is an enlarged, exploded view of the flex circuit bracket of FIG. 4 illustrating an opening formed in the base plate of the disc drive for accommodating an electrical connector at a terminal end of the flex circuit and a gasket seal for substantially sealing the opening, and further illustrating a notch formed in the seal to allow air to pass to the breather port formed in the flex circuit bracket.

FIGS. 4–8 illustrate a second embodiment of the breather filter where the filter 200 is essentially turned upside down so that ambient air passes through an opening formed in the base plate 102 as opposed to an opening in the top cover 104. Specifically, FIG. 5 illustrates that the flex circuit bracket 202 defines a breather port 204 aligned over the opening 140 formed in the base plate 102. As described above, the opening 140 in the base plate 102 allows a pass-through connector 206 to connect the electrical traces carried by the flex circuit 132 to an external circuit board (not shown) attached to the bottom surface of the base plate 102. The opening 140 thus represents a possible route for ambient air to enter the drive 100 through the base plate 102. While ambient air is typically prevented from entering the drive interior through the use of a gasket seal 210 that surrounds the pass-through connector 206 beneath the flex circuit bracket 202, the present invention utilizes a modified seal 210 that allows ambient air to pass through flex circuit bracket 202 as described in greater detail below.

FIG. 4 illustrates that the breather filter 200 is similar to the filter 150 described above, albeit with an opposite orientation and with the addition of two new attachment arms 220 for securing the filter 200 to the base plate 102. Specifically, the filter 200 includes a canister body 222 having a closed first end 224 and an open second end 226 that contains a circular filter screen 228 similar to that shown in the exploded view of FIG. 3. The closed first end 224 includes a filter inlet (hidden from view in FIG. 4) that mates with the breather port 204 formed in the flex circuit bracket 202 to provide fluid communication between the filter 200 and the ambient air. Unlike the filter 150 shown in FIGS. 1–3, the breather filter 200 preferably does not include a cylindrical stem 172 extending from the closed first end 224 of the filter. Rather, the closed first end 224 preferably sits flush against the planar top surface of the flex circuit bracket 202. In one preferred embodiment, an annular seal (not shown) is preferably inset within an annular groove (not shown) that surrounds the filter inlet (not shown) in the first end 224 to ensure an airtight seal between the filter inlet and the breather port 204 formed in the flex circuit bracket 202

Due to the fact that ambient air passes through the base plate 102 rather than the top cover 104, there is no need for the breather filter 200 to engage the top cover 104 as in the first embodiment shown in FIGS. 1–3. To the contrary, the open second end 226 of the breather filter 200 is preferably positioned a predetermined distance below the top cover 104 so ensure an unimpeded airflow path through the breather filter 200 and into the interior of the disc drive 100. In this case, the predetermined distance is preferably greater than the predetermined spacing between the open second end of the filter 150 and the flex circuit bracket 138 in the first embodiment (shown in FIGS. 1–3) because the top cover 104 may be subjected to compressive forces when the disc drive 100 is loaded within a computer. Thus, in order to ensure proper clearance between the filter outlet and the top cover 104, the predetermined distance is preferably on the order of 0.020 inches.

Because the breather filter 200 is not compressed between the top cover 104 and the flex circuit bracket 202 as in the first embodiment, the cylindrical filter body 222 preferably includes a set of attachment arms 220 having holes 230 that align with holes 232 formed in the flex circuit bracket 202 as shown in FIG. 4. The breather filter 200 also includes alignment arms 236 having slots 238 similar to those described above with respect to FIGS. 1–3 for aligning the filter 200 with the alignment pins 182 formed on the base plate. The alignment arms 236 and slots 238 allow the filter 200 to be aligned atop the flex circuit bracket 202 so that the holes 230 of the attachment arms 220 align with the holes 232 formed in the flex circuit bracket 202. Fasteners such as screws 240 are then secured to the base plate 102 through both the holes 230 and 232 so that the closed first end 224 of the filter 200 is mounted flush against the top surface of the flex circuit bracket 202.

Thus, the embodiment of the breather filter 200 shown in FIGS. 4–8 differs from the first embodiment of the filter 150 in FIGS. 1–3 since the closed first end is mounted flush against the flex circuit bracket 202 (as opposed to the open second end being held a predetermined distance above the flex circuit bracket). Furthermore, the filter 200 is secured in place against the flex circuit bracket 202 through the use of the attachment arms 220 and the fasteners 240. The direct connection of the filter 200 to the flex circuit bracket 202 provides an additional benefit of increasing the stiffness of the flex circuit bracket 202 and preventing undesirable bowing or flexing of the bracket 202 between the fasteners 240. However, as with the first embodiment described above, the breather filter 200 benefits from a relatively simplified "top down" installation whereby the filter 200 is attached directly to the base plate 102 atop the flex circuit bracket 202 without the need for any adhesives and without any connection at all to the top cover 104.

In order to provide access to the ambient air outside of the drive 100, the gasket 210 that normally provides an airtight seal around the pass-through connector 206 is modified by the inclusion of a notch 244 (FIG. 5) that allows air to flow around the connector 206. Because the connector 206 is typically spaced from the bottom surface of the flex circuit bracket 202 by solder legs, air is allowed to pass through the notch 244 and between the connector 206 and the flex circuit bracket 202 to gain access to the breather port 204. Alternatively, the breather port 204 may be offset so that the notch 204 is aligned with the breather port 204 on the underside of the flex circuit bracket 202, thereby providing a more direct route for ambient air passing through the opening 140 in the base plate 102 and into the filter 200 through the breather port 204 in the flex circuit bracket 202.

Figure 6:
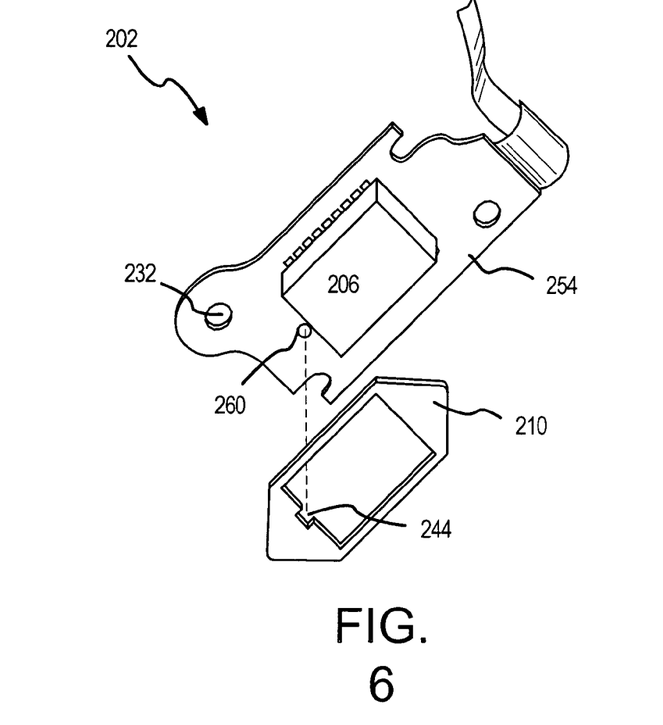
FIG. 6 is an exploded bottom view of the flex circuit bracket and corresponding seal illustrated in FIG. 5.
Figure 7:
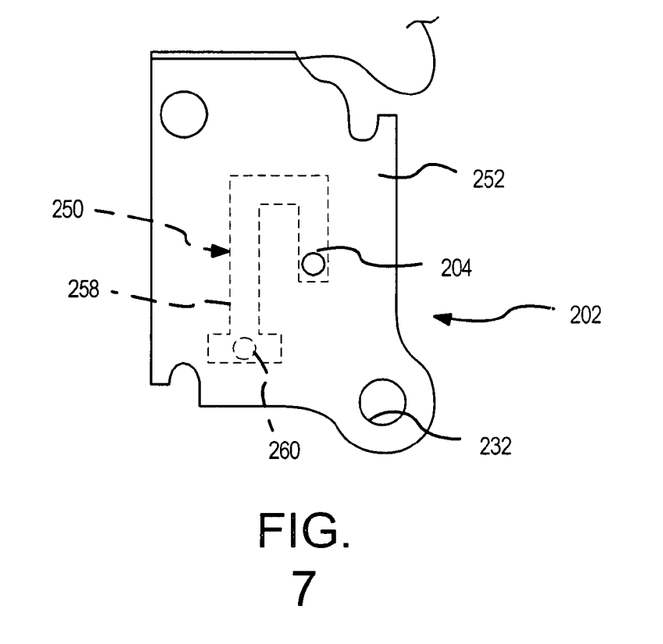
FIG. 7 is an enlarged top view of the flex circuit bracket of FIG. 5 with hidden lines depicting a diffusion tube formed in the flex circuit bracket between an inlet port in the bottom surface of the flex circuit bracket and an outlet port formed in a top surface of the flex circuit bracket.
Figure 8:
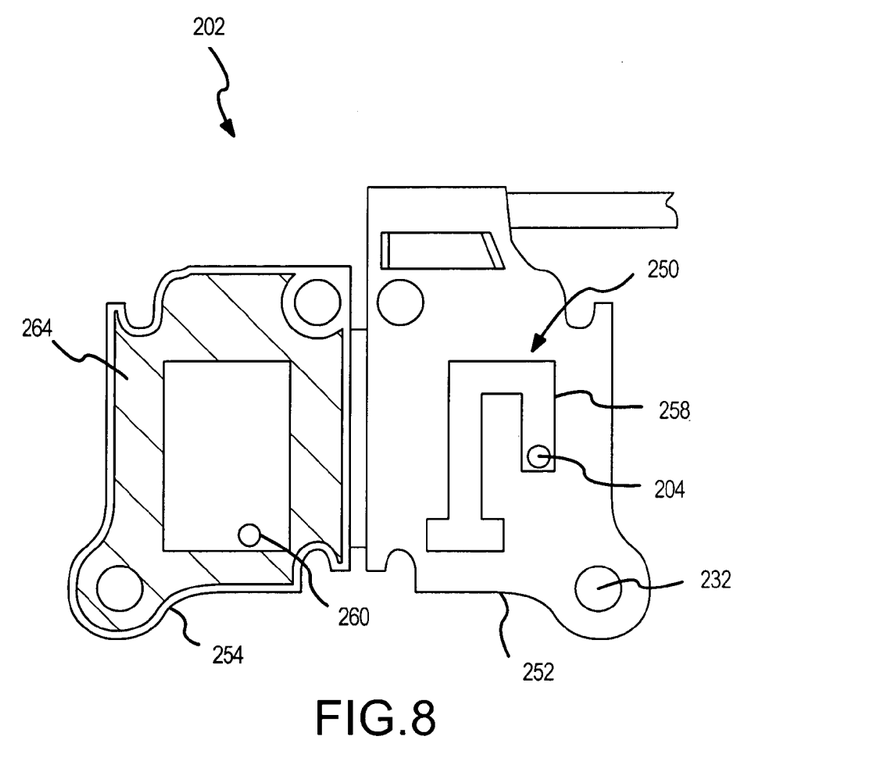
FIG. 8 is an unfolded plan view of the two portions of the flex circuit bracket shown in FIGS. 5–7 illustrating a diffusion channel formed in the inner surface of a top portion of the flex circuit bracket, and further depicting a pressure sensitive adhesive on the bottom portion of the flex circuit bracket to seal the two portions of the flex circuit bracket together and form the diffusion tube between the inlet and outlet ports.

While in one embodiment the breather port 204 could be formed as a straight passage through the flex circuit bracket 202, FIGS. 4–8 describe a preferred embodiment where the flex circuit bracket 202 includes an integral diffusion tube 250 (FIGS. 7 and 8) so that the breather port 204 formed in the top surface of the flex circuit bracket 202 represents an outlet of the diffusion tube 250. Specifically, FIG. 8 illustrates that the flex circuit bracket 202 is preferably formed from two separate portions, a top portion 252 and a bottom portion 254, bonded together to form the unified bracket 202. The top portion 252 preferably includes a J-shaped channel 258 where the breather port or diffusion tube outlet 204 is formed as a hole that passes through the top portion 252 at one end of the channel 258. In the preferred embodiment, the two portions 252 and 254 of the flex circuit bracket 202 are formed from a metal such as aluminum and the J-shaped channel 258 is formed during the creation of the top portion 252 (such as during molding through the use of progressive dies). However, the flex circuit bracket portions 252 and 254 may be formed from different materials (such as a polymer), and alternative means (such as etching) may also be employed for forming the channel 258 in the top portion 252.

The opposing bottom portion 254 of the flex circuit bracket 202 includes a diffusion tube inlet 260 that is aligned with an opposite end of the J-shaped channel 258 when the top and bottom portions 252 and 254, respectively, are bonded together. Indeed, the bottom portion 254 preferably includes a pressure sensitive adhesive or a double sided tape 264 applied to its surface for bonding the two portions of the flex circuit bracket 202 together. As shown in FIG. 8, the adhesive/tape 264 is arranged on the bottom portion 254 so that the tape substantially overlaps the channel 258 formed in the top portion 252 of the bracket 202. Furthermore, while the channel 258 is shown in the top portion 252 of the flex circuit bracket, it is also possible to form the channel 258 in the bottom portion 254 of the flex circuit bracket so that the top portion 252 covers the channel 258 to form the diffusion tube 250.

Once the two portions 252 and 254 of the flex circuit bracket 202 are secured to one another, the diffusion tube 250 is formed within the flex circuit bracket 202 as shown by the hidden lines in FIG. 7. In particular, FIG. 7 illustrates a top view of the assembled flex circuit bracket 202 with the breather port or diffusion tube outlet 204 providing a connection point for the inlet of the filter 200. FIG. 7 further shows with hidden lines the relative position of the diffusion tube inlet 260 that provides access to the diffusion tube 250 for air passing through the opening 140. FIG. 6 further illustrates the alignment of the diffusion tube inlet 260 with the notch 244 formed in the gasket seal 210 so that ambient air can access the inlet 260 through the opening 140 in the base plate and the notch 244 in the seal 210.

Regardless of whether the breather port 204 passes straight through the flex circuit bracket 202 or whether the flex circuit bracket 202 includes an integral diffusion tube 250 as described above, one benefit of forming the breather port in the flex circuit bracket 202 is that the breather filter 200 may be directly attached to the flex circuit bracket without requiring a connection between the filter 200 and the top cover 104 of the drive 100. Indeed, if the cover 104 should ever need to be removed (such as during a factory rework of the drive 100), the breather filter 200 will not be impacted by the removal of the cover 104.

In sum, the two embodiments of the breather filter are similar in that they both are supported atop the flex circuit bracket and take advantage of the relatively large amount of space available between the flex circuit bracket and the top cover of the disc drive. While prior art disc drives may employ canister filters located in the same region of the disc drive, these drives uniformly utilize an adhesive material to bond the filter to inner surface of the drive top cover. Such adhesive bonds present a number of drawbacks as described above and do not lend themselves to a "top down" assembly technique where the drive components are assembled to the base plate. Furthermore, while a top breather port may be preferred for testing purposes as described above, the present invention presents a novel location for a bottom breather port, i.e., extending through the flex circuit bracket itself so that the filter may be securely attached atop the flex circuit bracket without requiring any contact with the top cover.

In summary, the present invention is a disc drive (such as 100) having a base plate (such as 102) and a top cover (such as 104) defining an interior volume encompassing a drive motor supporting a data storage disc (such as 108) thereon and an actuator assembly (such as 110) for transferring data to and from the disc, the actuator assembly including a flex circuit (such as 132) having a pass-through electrical connector (such as 206) extending through an opening (such as 140) formed in the base plate to provide a data transfer path between the disc and circuitry external to the interior volume. The disc drive includes a flex circuit bracket (such as 138 and 202) having a bottom surface attached to the pass-through electrical connector (such as 206), the flex circuit bracket secured to the base plate (such as 102) to position the pass-through electrical connector within the opening (such as 140) formed in the base plate. A breather filter (such as 150 and 200) attached to a top surface of the flex circuit bracket (such as 138 and 202) includes an inlet (such as 156) in fluid communication with ambient air outside of the disc drive, and an outlet (such as 160 and 228) in fluid communication with the interior volume of the disc drive, wherein the breather filter provides chemical and particulate filtering of the ambient air.

In one preferred embodiment, the filter inlet (such as 156) communicates with a breather port (such as 170) formed in the top cover (such as 104) of the disc drive, and alignment arms (such as 164) support the filter (such as 150) a predetermined distance above the flex circuit bracket (such as 138) to provide an uninterrupted flow of air from the filter outlet (such as 160) to the interior of the disc drive. In another embodiment, the filter inlet communicates with a breather port (such as 204) formed in the flex circuit bracket (such as 202) so that an opposite end of the filter (such as 226) is positioned a predetermined distance below the top cover (such as 104) of the disc drive to allow air to vent from the filter outlet (such as 228) to the interior volume of the disc drive. The filter inlet (such as 156) may be placed in fluid communication with a diffusion tube (such as 190 and 250) so that the ambient air is forced to pass through the diffusion tube prior to entering the filter (such as 150 and 200).

Another embodiment of the present invention comprises a disc drive (such as 100) having a base plate (such as 102), a top cover (such as 104), a flex circuit bracket (such as 138 and 202) attached to the base plate, and a breather filter (such as 150 and 200) supported by the flex circuit (such as 170 and 204) formed in the disc drive. The breather port (such as 170) may be formed in the top cover (such as 104) of the disc drive so that the breather filter (such as 150) is retained between the top cover (such as 104) and the flex circuit bracket (such as 138) without the use of adhesives. Alternatively, the breather port (such as 204) may be formed in the flex circuit bracket (such as 202) with a first end (such as 224) of the breather filter (such as 200) securely attached to the flex circuit bracket (such as 202) so that a second end (such as 226) of the breather filter containing the filter outlet (such as 228) is positioned a predetermined distance below the top cover (such as 104) without engaging the top cover of the disc drive.

A further embodiment of the present invention relates to a method assembling a disc drive (such as 100) including the steps of (a) installing a flex circuit bracket (such as 138 and 202) onto a base plate (such as 102) of the disc drive; (b) attaching a breather filter (such as 150 and 200) to a top surface of the flex circuit bracket (such as 138 and 202), wherein the filter (such as 150 and 200) has a first end (such as 154 and 224) defining a filter inlet (such as 156 adapted to engage a breather port (such as 170 and 204) formed in the disc drive, and a second end (such as 158 and 226) defining a filter outlet (such as 160 and 228) adapted to expel filtered air into an interior volume of the disc drive; and (c) attaching a top cover (such as 104) to the base plate (such as 102) without adhering the breather filter (such as 150 and 200) to an inside surface of the top cover (such as 104).

It will be clear that the present invention is well adapted to attain the ends and advantages mentioned as well as those inherent therein. While presently preferred embodiments have been described for purposes of this disclosure, various changes and modifications may be made which will readily suggest themselves to those skilled in the art and thus are within the scope of the present invention. For example, the shape or internal construction of the breather filter may be varied to address specific disc drive designs or specific filtering needs (e.g., specific ambient environments). Additionally, the precise locations of the breather ports in both the top cover and the flex circuit bracket may be altered and the construction of the different diffusion tubes may be altered by those skilled in the art. Indeed, as noted above, a diffusion tube is not a necessary component of the present invention which primarily addresses the location of the breather filter in relation to the flex circuit bracket, as well as the ability to secure the breather filter within the disc drive without the use of an adhesive attachment to the top cover. Accordingly, all such modifications, changes and alternatives are encompassed in the spirit of the invention disclosed and as defined in the appended claims.

What is claimed is:

1. A flex circuit assembly comprising:
 a flex circuit bracket having a bottom surface attached to a base of a data storage system and a top surface;
 a filter assembly having a filter body attached to the top surface of the flex circuit bracket, the filter assembly comprising:
  a first end having an inlet that communicates with ambient air outside the data storage system through an aperture on a top cover of the data storage system; and
  a second end having an outlet that communicates with an interior volume within the data storage system.

2. The flex circuit assembly of claim 1 wherein the filter assembly further includes alignment arms extending outwardly from the body to support and align the filter body on the flex circuit bracket.

3. The flex circuit assembly of claim 2 wherein the alignment arms support the second end of the filter assembly a predetermined distance above the flex circuit bracket.

4. The flex circuit assembly of claim 1 wherein the filter body of the filter assembly is retained between the flex circuit bracket and the top cover of the data storage system.

5. The flex circuit assembly of claim 1 further comprising a seal surrounding the filter inlet and compressed between the first end of the filter body and an inner surface of the top cover to provide a hermetic seal substantially preventing air from leaking into the interior volume of the data storage system through the aperture.

6. The flex circuit assembly of claim 5 wherein the seal further comprises two concentric, raised annular rings that independently contact the inner surface of the top cover to provide a redundant seal.

7. The flex circuit assembly of claim 5 wherein the filter assembly further comprises a cylindrical stem extending upward from the first end of the filter body so that the cylindrical stem extends through a central opening formed in the seal, wherein the cylindrical stem defines the filter inlet.

8. The flex circuit assembly of claim 1 wherein the filter body of the filter assembly includes a diffusion tube and a chemical filter, the diffusion tube is connected to the filter inlet such that ambient air travels through the diffusion tube prior to experiencing chemical filtering with the chemical filter.

9. The flex circuit assembly of claim 8 wherein the diffusion tube is defined by a channel formed in the first end of the filter body and a disc that that is attached to the first end of the filter body to cover the channel, wherein the filter inlet protrudes through the first end of the filter body at one end of the channel and wherein the disc includes an opening at an opposite end of the channel to provide fluid communication between the diffusion tube and the body of the filter assembly.

10. A disc drive having a base plate, a top cover attached to the base plate to form an interior volume of the disc drive, and a flex circuit having a pass-through electrical connector extending through an opening formed in the base plate, the disc drive comprising:
   a flex circuit bracket having a bottom surface attached to the pass-through electrical connector, the flex circuit bracket secured to the base plate to position the pass-through electrical connector within the opening formed in the base plate; and
   a breather filter having a filter body attached to a top surface of the flex circuit bracket, wherein the breather filter includes an inlet in fluid communication with ambient air outside of the disc drive and an outlet in fluid communication with the interior volume of the disc drive, the inlet communicates with a breather port formed in the top cover of the disc drive and the filter body is retained between the flex circuit bracket and the top cover, wherein the breather filter provides chemical and particulate filtering of the ambient air.

11. The disc drive of claim 10 wherein the body has a first end defining the filter inlet and a second end defining the filter outlet.

12. The disc drive of claim 11 wherein the breather filter further includes alignment arms extending outwardly from the body to support and align the breather filter on the flex circuit bracket.

13. The disc drive of claim 12 wherein the alignment arms support the filter outlet a predetermined distance above the flex circuit bracket.

14. The disc drive of claim 13 further comprising a seal surrounding the filter inlet and compressed between the first end of the filter body and an inner surface of the top cover to provide a hermetic seal substantially preventing air from leaking into the interior volume of the disc drive through the breather port.

15. The disc drive of claim 14 wherein the seal further comprises two concentric, raised annular rings that independently contact the inner surface of the top cover to provide a redundant seal.

16. The disc drive of claim 14 wherein the breather filter further comprises a cylindrical stem extending upward from the first end of the filter body so that the cylindrical stem extends through a central opening formed in the seal, wherein the cylindrical stem defines the filter inlet.

17. The disc drive of claim 14 wherein the breather filter includes a diffusion tube connected to the filter inlet whereby ambient air travels through the diffusion tube prior to experiencing chemical filtering within the body of the breather filter.

18. The disc drive of claim 17 wherein the diffusion tube is defined by a channel formed in the first end of the filter body and a disc that that is attached to the first end of the filter body to cover the channel, wherein the filter inlet protrudes through the first end of the filter body at one end of the channel and wherein the disc includes an opening at an opposite end of the channel to provide fluid communication between the diffusion tube and the body of the breather filter.

* * * * *